(12) United States Patent
Kibby et al.

(10) Patent No.: US 7,973,087 B2
(45) Date of Patent: *Jul. 5, 2011

(54) PROCESS OF SYNTHESIS GAS CONVERSION TO LIQUID FUELS USING MIXTURE OF SYNTHESIS GAS CONVERSION CATALYST AND DUAL FUNCTIONALITY CATALYST

(75) Inventors: Charles L. Kibby, Benicia, CA (US); Kandaswamy Jothimurugesan, Hercules, CA (US); Tapan K. Das, Albany, CA (US); Robert J. Saxton, Pleasanton, CA (US); Allen W. Burton, Jr., Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/902,915

(22) Filed: Oct. 12, 2010

(65) Prior Publication Data

US 2011/0118368 A1    May 19, 2011

Related U.S. Application Data

(63) Continuation of application No. 12/621,385, filed on Nov. 18, 2009, now Pat. No. 7,825,164.

(51) Int. Cl.
*C07C 27/00* (2006.01)
(52) U.S. Cl. ......... 518/715; 518/700; 518/705; 518/716
(58) Field of Classification Search .................. 518/700, 518/705, 715, 716
See application file for complete search history.

(56) References Cited

U.S. PATENT DOCUMENTS

| | | | |
|---|---|---|---|
| 4,279,830 | A | 7/1981 | Haag et al. |
| 4,304,871 | A | 12/1981 | Brennan et al. |
| 4,595,702 | A | 6/1986 | Chu et al. |
| 4,617,288 | A | 10/1986 | Bell et al. |
| 6,225,359 | B1 | 5/2001 | O'Rear et al. |
| 6,410,814 | B2 | 6/2002 | Fujimoto et al. |
| 6,472,441 | B1 | 10/2002 | Kibby |
| 7,157,501 | B2 | 1/2007 | Steenwinkel et al. |
| 7,297,825 | B2 | 11/2007 | Fujimoto et al. |
| 7,459,485 | B2 | 12/2008 | Botes et al. |
| 7,507,326 | B2 | 3/2009 | Farshid et al. |
| 2001/0027259 | A1 | 10/2001 | Fujimoto et al. |
| 2006/0167119 | A1 | 7/2006 | Leng et al. |
| 2009/0124712 | A1 | 5/2009 | De Figueiredo Costa et al. |

FOREIGN PATENT DOCUMENTS

WO    9404476    3/1994

OTHER PUBLICATIONS

Alba Mena Subiranas and Georg Schaub, Combining Fischer-Tropsch (FT) and Hydrocarbon Reactions under FT Reaction Conditions—Catalyst and Reactor Studies with Co and Fe and Pt/ZSM-5, 2007, Universitat Karlsruhe.
Liu, Li, Asami and Fujimoto, Formation of Isoparaffins through PB/β Zeolite Application in Fischer-Tropsch Synthesis, 2005, American Chemical Society.
Liu, Li, Asami, Fujimoto, Selective production of iso-paraffiins from syngas over $Co/SiO_2$ and Pd/beta hybrid catalyst, 2005, Elsevier.
Zhao, Chang, Yoneyama, and Tsubaki, Selective Synthesis of Middle Isoparaffins via a Two-Stage Fischer-Tropsch Reaction: Activity Investigation for a Hybrid Catalyst, 2005, Ind. Eng. Chem. Res.
Li, Asami, Luo, Michiki, Tsubaki, Fujimoto, Direct synthesis of middle iso-paraffins from synthesis gas, 2003, Catalysis Todsy.
Nam, Cho, Seo, Hwang, Jun, Song, Production of Middle Distillate from Synthesis Gas in a Dual-bed Reactor Through Hydrocracking of Wax Over Mesoporous $Pd-Al_2O_3$ Composite Catalyst, 2009, Catal Lett.
Liu, Li, Asami, Fujimoto, High performance Pd/beta catalyst for the production of gasoline-range iso-paraffins via a modified Fischer-Tropsh reaction, 2006, Applied Catalysis.
Liu, Li, Asami, Fujimoto, Iso-paraffins synthesis from modified Fischer-Tropsch reaction—Insights into Pd/beta catalysts, 2005, Catalysis Today.
Li, Asami, Luo, Fujimoto, Synthesis of isoparaffins from synthesis gas, 2005, Studies in Surface Science and Catalysis.
Pour, Shahri, Zamini, Irani, Tehrani, Deactivation studies of bifunctional Fe-HZSM5 catalyst in Fischer-Tropsch process, 2008. Journal of Natural Gas Chemistry.
Martinez, Valencia, Murciano, Cerqueira, Costa, S.-Aguiar, Catalytic behavior of hybrid Co/SiO2-(medium-pore) zeolite catalysts during the one-stage conversion of syngas to gasoline, 2008, Applied Catalysis A: General.
U.S. Appl. No. 12/343,534, filed Dec. 24, 2008.

*Primary Examiner* — Jafar Parsa
(74) *Attorney, Agent, or Firm* — Karen DiDomenicis; Richard Schulte

(57) ABSTRACT

A process is disclosed for converting a feed comprising synthesis gas to liquid hydrocarbons within a single reactor at essentially common reaction conditions. The synthesis gas contacts a catalyst bed comprising a mixture of a synthesis gas conversion catalyst on a support containing an acidic component and a dual functionality catalyst including a hydrogenation component and a solid acid component. The hydrocarbons produced are liquid at about 0° C., contain at least 25% by volume $C_{10+}$ and are substantially free of solid wax.

14 Claims, No Drawings

PROCESS OF SYNTHESIS GAS CONVERSION TO LIQUID FUELS USING MIXTURE OF SYNTHESIS GAS CONVERSION CATALYST AND DUAL FUNCTIONALITY CATALYST

This application is a continuation of application Ser. No. 12/621,385, filed Nov. 18, 2009, pending.

BACKGROUND

1. Field

The invention relates to a process for converting synthesis gas to liquid hydrocarbon mixtures useful as distillate fuel and/or lube base oil by contacting the gas with multiple catalysts in a mixed bed arrangement within a single reactor.

2. Description of Related Art

The majority of combustible liquid fuel used in the world today is derived from crude oil. However, there are several limitations to using crude oil as a fuel source. For example, crude oil is in limited supply.

Alternative sources for developing combustible liquid fuel are desirable. An abundant resource is natural gas. The conversion of natural gas to combustible liquid fuel typically involves a first step of converting the natural gas, which is mostly methane, to synthesis gas, or syngas, which is a mixture of carbon monoxide and hydrogen. Fischer-Tropsch synthesis is a known means for converting syngas to higher molecular weight hydrocarbon products. Fischer-Tropsch diesel has a very high cetane number and is effective in blends with conventional diesel to reduce $NO_x$ and particulates from diesel engines, allowing them to meet stricter emission standards.

Fischer-Tropsch synthesis is often performed under conditions which produce a large quantity of $C_{21}+$ wax, also referred to herein as "Fischer-Tropsch wax" or simply "wax," which must be hydroprocessed to provide distillate fuels. Often, the wax is hydrocracked to reduce the chain length, and then hydrotreated to reduce oxygenates and olefins to paraffins. Hydrocracking tends to reduce the chain length of all of the hydrocarbons in the feed. When the feed includes hydrocarbons that are already in a desired range, for example, the distillate fuel range, hydrocracking of these hydrocarbons is undesirable.

Considerably different process conditions are required for hydrocracking and hydroisomerization of Fischer-Tropsch wax using relatively acidic catalysts such as ZSM-5 than for Fischer-Tropsch synthesis. For this reason commercial Fischer-Tropsch plants using fixed bed reactors require separate reactors for the Fischer-Tropsch synthesis and for the subsequent hydrocracking of the resulting wax, and complicated and expensive separation schemes may be required to separate solid wax from lighter products.

It would be advantageous to provide a process in which a desired liquid hydrocarbon product in the distillate fuel and/or lube base oil range, having a minimum of lighter product and no solid phase wax, is synthesized within a single reactor bed at a common set of conditions.

SUMMARY OF THE INVENTION

The invention relates to a process for converting synthesis gas to liquid hydrocarbons in a single reactor comprising:
contacting a feed comprising a mixture of carbon monoxide and hydrogen having a $H_2/CO$ ratio of between about 1 and about 2 with a catalyst bed comprising a mixture of:

(a) a synthesis gas conversion catalyst including cobalt on a support containing an acidic component; and (b) a dual functionality catalyst including a hydrogenation component and a solid acid component;

wherein the weight ratio of solid acid component to cobalt is between about 7 and about 17;

at a pressure of greater than about 5 atmospheres and a temperature of between about 210° C. and about 230° C., thereby resulting in a hydrocarbons product containing at least about 25 vol % $C_{10}+$, containing no greater than about 5 wt $C_{21}+$ and containing no greater than about 25 wt % $C_1$-$C_4$;

wherein the process has a productivity of at least about 2 g of hydrocarbons per g of cobalt per hour as determined at 10 atmospheres, 215° C. and a $H_2/CO$ ratio of 1.5.

DETAILED DESCRIPTION OF THE INVENTION

A process is disclosed for the synthesis of liquid hydrocarbons in the distillate fuel and/or lube base oil range from synthesis gas in a single reactor. Provided within the process is a method for synthesizing a mixture of olefinic and paraffinic hydrocarbons by contacting the synthesis gas with a mixture of a plurality of synthesis gas conversion catalyst particles including cobalt supported on a support containing an acidic component and a plurality of dual functionality catalyst particles including a hydrogenation component and a solid acid component. The two pluralities of particles are combined in a bed in which the two pluralities of particles are mixed uniformly, meaning there is no segregation between the two pluralities of particles. Within the bed, the hydrocarbon chains do not build up into the wax range ($C_{21+}$ normal paraffins). The presence of the noble metal promoted zeolite has been found to prevent the hydrocarbon chain from growing into the wax range.

Advantageously, a thin layer at the bottom of the catalyst bed (1-2% by volume) can be free of synthesis gas conversion catalyst, so that any wax formed contacts a hydrocracking catalyst.

The hydrocarbon mixture so formed can range from methane to light wax, and may include linear, branched and cyclic compounds. The synthesis gas conversion is carried out in a single reactor under essentially common reaction conditions without having to provide a separate reactor for hydrocracking and hydroisomerization. By "essentially common reaction conditions" is meant that the temperature of the cooling medium within the reactor is constant from one point to another within a few degrees Celsius (e.g., 0-3° C.) and the pressure within the reactor is allowed to equilibrate between points within the reactor.

A feed of synthesis gas is introduced to the reactor via an inlet. The ratio of hydrogen to carbon monoxide of the feed gas is generally high enough that productivity and carbon utilization are not negatively impacted without the addition of hydrogen into the reactor or production of additional hydrogen using water-gas shift. The ratio of hydrogen to carbon monoxide of the feed gas is also generally below a level at which excessive methane would be produced. Advantageously, the ratio of hydrogen to carbon monoxide is between about 1 and about 2. If desired, pure synthesis gas can be employed or, alternatively, an inert diluent, such as nitrogen, $CO_2$, methane, steam or the like can be added. The phrase "inert diluent" indicates that the diluent is non-reactive under the reaction conditions or that the diluent is a normal reaction product.

If the $H_2/CO$ ratio is below 2 at the reactor inlet, it will decrease through the reactor because the usage ratio is at least 2 for olefins and paraffins and cobalt is inactive for water gas shift. This may be accommodated by operating at partial conversion and recycling the unreacted synthesis gas having a low $H_2/CO$ ratio. Mixing the recycled gas with the proper flow rate of fresh syngas having at least the usage ratio of $H_2$ to CO will provide the desired $H_2/CO$ ratio at the reactor inlet.

The synthesis gas conversion catalyst contains cobalt which advantageously has low water gas shift activity and is suitable for lower temperature reactions. The synthesis gas conversion catalyst can be supported on any suitable binder, such as solid oxides, including but not limited to alumina, silica or titania, further containing an acidic component. A portion of the cobalt resides on the binder.

The acidic component can be, for example a relatively acidic zeolite, for isomerizing double bonds in $C_4^+$ olefins as they are formed. Methods for preparing a catalyst of this type are described in co-pending U.S. patent application Ser. No. 12/343,534, the disclosure of which is hereby incorporated by reference. Such a method comprises impregnating a zeolite extrudate using a solution comprising a cobalt salt to provide an impregnated zeolite extrudate and activating the impregnated zeolite extrudate by a reduction-oxidation-reduction cycle. Impregnation of a zeolite using a substantially non-aqueous cobalt solution followed by activation by a reduction-oxidation-reduction cycle reduces cobalt ion-exchange with zeolite acid sites, thereby increasing the overall activity of the zeolite component. The resulting zeolite supported cobalt catalyst comprises cobalt metal distributed as small crystallites upon the zeolite support. The cobalt content of the zeolite supported cobalt catalyst can depend on the alumina or other binder, such as silica, content of the zeolite support. For example, for an alumina content of about 20 to about 99 weight % based upon support weight, the catalyst can contain, for example, from about 1 to about 20 weight % cobalt, preferably 5 to about 15 weight % cobalt, based on total catalyst weight, at the lowest alumina content. At the highest alumina content the catalyst can contain, for example, from about 5 to about 50 weight % cobalt, preferably from about 10 to about 25 weight % cobalt, based on total catalyst weight.

The synthesis gas conversion catalyst can include a promoter selected from ruthenium, rhenium, platinum, palladium, iridium, osmium, rhodium, gold, silver, and any suitable group IIIB or IVB metal oxide. Such promoters are disclosed in South African Patent Application No. 855317.

When a ruthenium promoter is used, the reduction-oxidation-reduction cycle used to activate the catalyst includes a first reduction step at a temperature in a range of about 200° to about 350° C. in order to avoid formation of cobalt aluminate (or cobalt silicate when a silica support is used). If unpromoted cobalt is used, this first reduction temperature can be increased to 400° C. to ensure full reduction. Following the first reduction step, an oxidation step at a temperature in a range of about 250° to about 300° C. is conducted, followed by a second reduction step at a temperature in a range of about 200° to about 350° C.

The synthesis gas conversion catalyst has an average particle diameter, which depends upon the type of reactor to be utilized, of from about 0.01 to about 6 millimeters; for example, from about 1 to about 6 millimeters, even from about 1 to about 3 millimeters for a fixed bed; and for example, from about 0.03 to about 0.15 millimeters for a reactor with the catalyst suspended by gas, or gas-liquid media (e.g., fluidized beds). The lower limits on particle size in a fixed bed are determined by the maximum allowable pressure drops through the reactors and the strength of the particles. However, smaller particles yield less methane than larger ones due to diffusion limitations, so it is desirable to use particles as small as is practical. The catalyst particle size for use in fluidized beds depends on the catalyst density, the temperature, and the flow rate and pressure of gas in the reactor. The particle size is larger for higher volumetric flows, higher densities, and higher temperatures. Fluid bed catalyst particles need to be small enough so that they stay suspended readily, but not so fine that they are easily ejected from the catalyst bed. To minimize attrition, spherical shapes are advantageous for fluid bed particles.

The dual functionality catalyst includes a hydrogenation catalyst for hydrogenating olefins and a solid acid catalyst component for isomerizing and/or cracking the straight chain hydrocarbons. The hydrogenation component is typically a metal or combination of metals selected from Group VIII noble and non-noble metals and Group VIB metals. Preferred noble metals include platinum, palladium, rhodium and iridium. Non-noble metals which can be used include molybdenum, tungsten, cobalt, etc. The non-noble metal hydrogenation metals are usually present in the final catalyst composition as oxides, when such compounds are readily formed from the particular metal involved. Preferred non-noble metal overall catalyst compositions contain in excess of about 5 weight percent, preferably about 5 to about 40 weight percent molybdenum and/or tungsten, and at least about 0.5, and generally about 1 to about 15 weight percent of cobalt determined as the corresponding oxides.

The hydrogenation component can be incorporated into the overall catalyst composition by any one of numerous procedures. It can be added either to the acid component, to the support or a combination of both. These components are usually added as a metal salt which can be thermally converted to the corresponding oxide in an oxidizing atmosphere or reduced to the metal with hydrogen or other reducing agent.

The acid component can be a material such as amorphous silica-alumina or tungstated zirconia or a zeolitic or non-zeolitic crystalline molecular sieve. The molecular sieve can be a medium pore molecular sieve, by which is meant herein molecular sieves having an average pore diameter of between about 0.5 nm and about 0.7 nm. Examples of suitable molecular sieves include zeolites ZSM-5, ZSM-11, ZSM-12, ZSM-23, ZSM-57, NU-87, ZSM-48, TON type zeolites, ferrierite, and TNU-9. Small and large pore zeolites can alternatively be used. Non-zeolitic molecular sieves which can be used include, for example silicoaluminophosphates (SAPO), ferroaluminophosphate, titanium aluminophosphate and the various ELAPO molecular sieves described in U.S. Pat. No. 4,913,799 and the references cited therein. Details regarding the preparation of various non-zeolite molecular sieves can be found in U.S. Pat. No. 5,114,563 (SAPO); U.S. Pat. No. 4,913,799 and the various references cited in U.S. Pat. No. 4,913,799, the disclosure of which is hereby incorporated by reference in their entirety. Mesoporous molecular sieves can also be included, for example the M41S family of materials (J. Am. Chem. Soc. 1992, 114, 10834-10843), MCM-41 (U.S. Pat. Nos. 5,246,689, 5,198,203, 5,334,368), and MCM48 (Kresge et al., Nature 359 (1992) 710).

The relative amounts of catalysts in the catalyst mixture can be suitably varied to obtain the desired product. If the ratio of syngas conversion catalyst to dual functionality catalyst is too low, the hydrocarbon synthesis productivity will be low; whereas if this ratio is too high, there will not be enough cracking activity to keep the product hydrocarbons liquid. In general, the weight of the syngas conversion catalyst is between about 0.2 and about 2.5 times the weight of the dual functionality catalyst, depending on factors including the acidity and activity of the catalysts used, and the pressure of operation. The higher the pressure, the higher the ratio of zeolite to cobalt. In order for the dual functionality component to be present in amounts large enough to ensure that no substantial amounts of wax forms, as would allow for the elimination a separate hydrocracker, then a safety factor to allow for differential aging would be applied and one would use a high zeolite/Co ratio. The weight ratio of zeolite to cobalt within the bed of the reactor is advantageously between about 7 and about 17. The reaction temperature is suitably greater than about 210° C., for example, from about 210° C. to about 230° C., when the reactor is a fixed bed reactor. Higher reaction temperatures favor lighter products. The total pressure is greater than about 5 atmospheres, for example, from about 5 to about 25 atmospheres. Higher reaction pressures favor heavier products. The gaseous hourly space velocity based upon the total amount of feed is less than about 8,000 volumes of gas per volume of catalyst per hour.

The process can be operated at partial conversion with recycle of the dry tail gas after liquids (water and $C_{5+}$ hydrocarbon products) are removed by condensation. This protects the catalyst from high steam pressures at high conversions. Recycle of the tail gas also allows any light olefins in it to be incorporated into C5+ liquids. The single pass CO conversion rate in the process is advantageously less than about 60%, but the overall conversion rate including recycle should be greater than about 90%.

The synthesis gas reaction of the present disclosure can occur in a fixed, fluid or moving bed type of operation.

The present process provides for a high yield of paraffinic hydrocarbons in the middle distillate and/or light base-oil range under essentially the same reaction conditions as the synthesis gas conversion. The hydrocarbons produced are liquid at about 0° C., contain at least % by volume $C_{10+}$ and no greater than about 5 wt % $C_{21+}$. In particular, the process provides a product having the following composition:

0-20, for example, 5-15 or 8-12, weight % $CH_4$;

0-20, for example, 5-5 or 8-12, weight % $C_2$-$C_4$;

50-95, for example, 60-90 or 75-80, weight % $C_{5+}$; and 0-5 weight % $C_{21+}$.

The liquid hydrocarbon product is substantially free of a distinct solid phase of $C_{21+}$ wax, by which is meant that there is no insoluble solid wax phase at ambient conditions. As a result, there is no need to separately treat a wax phase. The liquid hydrocarbon product preferably contains less than about 5% $C_{21}$+ normal paraffins or normal olefins.

In addition, the present process provides for a high yield of paraffinic hydrocarbons in the middle distillate and/or light base-oil range without the need for separation of products and without the need for a second reactor containing catalyst for hydrocracking and hydroisomerization. The productivity rate of the process is at least 2 grams of hydrocarbon per gram of cobalt per hour when determined at 10 atm reaction pressure, 215° C. reaction temperature and a $H_2$/CO feed ratio of 1.5.

An additional advantage to the present process is that undesired methane selectivity is kept low as a result of maintaining the process temperature in the lower end of the optimum range for Fischer-Tropsch synthesis and considerably lower than what is generally believed required for adequate hydrocracking and hydroisomerization activity of pure paraffins at high LHSV. It is well known that high methane selectivity is found at the elevated temperatures commonly used for hydrocracking and hydroisomerization.

EXAMPLES

The catalysts used in the examples were prepared as follows.
Catalyst 1 (20 wt % Co-0.5 wt % Ru-1% $La_2O_3$/$Al_2O_3$ Catalyst)

70 grams of extrudate of a gamma-alumina (Ketjen CK-300 commercially available from Akzo Chemie) which had been ground and sieved to 16-30 mesh size (0.589 mm-1.168 mm) and heated in air at 750° C. for 16 hours was used as a catalyst support. Separate portions comprising 0.1680 gram of ruthenium acetylacetonate, 2336 grams of lanthanum nitrate, and 87.563 grams of cobalt nitrate hexahydrate were dissolved in 181 cubic centimeters of acetone. The solution was divided into three equal parts and the alumina was contacted with the first portion of the catalyst solution with stirring. The solvent was removed from the impregnated alumina in a rotary evaporator at 40° C. The dried material was then calcined in air at 300° C. for two hours. The calcined catalyst was then impregnated with the second portion of the catalyst solution and the drying and calcining steps were repeated. The calcined catalyst was then impregnated, dried, and calcined as before for a third time. The catalyst analyzed 20.0 weight percent cobalt, 1.0 weight percent lanthanum oxide, 0.5 weight percent ruthenium, and the remainder alumina The catalyst was diluted 50:50 by weight with silicon carbide having a similar size.
Catalyst 2 (0.5% Pd/ZSM-5)

1.305 g of palladium nitrate was dissolved in 120 cc of water. The resulting solution was added to 120 g of alumina-bound ZSM-5 (20% alumina, 80% ZSM-5) extrudates (Zeolyst CBV 014 available from Zeolyst International, having a Si/Al ratio of 40). The extrudates were calcined at 550° C. for 2 hours and then cooled to ambient temperature prior to impregnation. Most of the water was removed in a rotary evaporator under vacuum by heating slowly to 65° C. The vacuum-dried material was then further dried in an oven at 120° C. overnight. The dried catalyst was calcined at 300° C. for 2 hours in a muffle furnace.
Catalyst 3 (0.5% Pd/SSZ-33)

0.2441 g of palladium nitrate (from Aldrich) was dissolved in 20 cc of water. The resulting solution was added to 15 g of SSZ-33 zeolite (prepared according to U.S. Pat. No. 7,022,308). Most of the water was removed in a rotary evaporator under vacuum by heating slowly to 65° C. The vacuum-dried material was then further dried in an oven at 120° C. overnight. The dried catalyst was calcined at 300° C. for 2 hours in a muffle furnace.
Preparation of Mixed Catalyst Beds
Catalyst 4

Catalyst 1 and Catalyst 2 were graded to a particle size suitable for testing in the reactors, approximately 125 µm-160 µm, and then thoroughly mixed. Mixtures were packed carefully to avoid segregation of their individual components and to minimize their packed volume so they would fit within the isothermal zone. A target loading of 50 mg cobalt was used for each catalyst test.
Catalyst 5

Catalyst 1 and Catalyst 3 were graded to a particle size suitable for testing in the reactors, approximately 125 µm-160 µm, and then thoroughly mixed. Mixtures were packed carefully to avoid segregation of their individual components and to minimize their packed volume so they would fit within the isothermal zone. A target loading of 50 mg cobalt was used for each catalyst test.

Synthesis in Single Pass Reactors

A multireactor parallel testing unit was used to evaluate catalyst performance at 10-30 atm pressures and 200-230° C. temperatures for 1-2 mL catalyst charges. It was operated in a single pass mode with unreacted synthesis gas and light hydrocarbon products sent directly to vent or to an analysis unit. The isothermal zone in each reactor, where the wall temperature was maintained within ±1° C. of the target temperature, was about 80 mm long.

Mixed bed catalysts 4 and 5 were tested simultaneously at conditions of 10-20 atm pressure and 180° C.-225° C., with flows of 2000 sccm/g synthesis gas having $H_2/CO=1.5-2.0$. Each catalyst was conditioned in a 2 L/g/h flow of synthesis gas at 10 atm and 205-210° C. for 300 hours. The $H_2/CO$ ratio in the synthesis gas was 2 during conditioning. CO conversion and hydrocarbon selectivity data were then collected at 215° C., 10 atm, and $H_2/CO=1.5$, also at a flow of 2 L/g/h. Catalyst 4 was a 29:71 mixture by weight of Catalyst 1 and Catalyst 2. Catalyst 5 was a 29:71 mixture by weight of Catalyst 1 and Catalyst 3. Catalysts 4 and 5 were tested without further dilution. Catalysts 4 and 5 contained 5.7 wt % Co and 70+ wt % zeolite, so that the zeolite/Co weight ratio was 12.5. Five separate runs were made with these catalysts.

Tables 1 and 4 compare CO conversion rates for the two catalysts of Catalysts 1 and 4 calculated on the basis of cobalt weight. Specific synthesis rates based on cobalt weight were 2-3 g hydrocarbons (mean composition estimated as $CH_{2.2}$) per g of cobalt per hour at 215° C., 10 atm, inlet $H_2/CO=1.5$, and 2000 sccm/g/h (40,000 $sccm/g_{Co}/h$). Tables 2 and 5 show relative amounts of $CO_2$, $CH_4$, $C_2$-$C_3$, $C_4$-$C_{20}$ and $C_{21}+$ hydrocarbons made by the two catalysts.

The results of Tables 1, 2, 4 and 5 demonstrate the effectiveness of physically mixing a dual functionality catalyst including a hydrogenation component and a solid acid component with a Fischer-Tropsch synthesis (FTS) catalyst. Tables 1 and 4 show that synthesis rates based on the amount of cobalt present remain acceptably high while at the same time, as shown in Tables 2 and 5, selectivity of desirable liquid hydrocarbons in the $C_4$-$C_{20}$ range is high and selectivity of undesirable $C_{21}+$ is low. The $C_{21}+$ fraction for the FTS catalyst alone was about 14% at this pressure. The mixed catalyst has a greatly reduced $C_{21}+$ selectivity. At this low $C_{21}+$ amount the wax fraction is completely soluble in the total hydrocarbon product; thus one advantage of physically mixing a hydrogenation component and a solid acid component with a Fischer-Tropsch synthesis (FTS) catalyst is the lack of a separate, solid wax phase in the product. The $CO_2$ selectivity was less than 1% of the CO converted for all of the catalysts.

Tables 3 and 6 illustrate the $C_4$ isomer distributions for the FTS and physically mixed catalyst containing a dual functionality component Pd/ZSM-5 or Pd/SSZ-33. The dual functionality component is capable of both double bond isomerization as well as skeletal isomerization to give branched isomers. In either case the result is a sharp reduction in chain growth leading to a dramatic decrease in $C_{21}+$ selectivity. Tables 3 and 6 clearly show the effectiveness of the dual functionality component Pd/ZSM-5 or Pd/SSZ-33 to provide for a greater percentage of double bond isomerization (2-butene vs. 1-butene) as well as a higher degree of branching for the $C_4$ fraction.

TABLE 1

Activities of FTS alone and Mixed Bed with Pd/ZSM-5 at 215° C., 10 atm, and $H_2/CO = 1.5$, TOS > 300 h

| | | Synthesis Rates | |
|---|---|---|---|
| Catalyst | Zeolite/Co | $gCH_{2.2}/g_{catalyst}/h$ | $gCH_{2.2}/g_{Co}/h$ |
| FTS alone | 0 | 0.48 | 2.4 |
| 30:70 FTS + Pd/ZSM-5 | 12.5 | 0.18 | 3.2 |

TABLE 2

Carbon Number Distributions for FTS and Mixed Bed of FTS with Pd/ZSM-5 at 215° C., 10 atm, and $H_2/CO = 1.5$, TOS > 300 h

| | | Product Distribution (C % of total) | | | | |
|---|---|---|---|---|---|---|
| Catalyst | Zeolite/Co | $CH_4$ | $C_2$-$C_3$ | $C_4$-$C_{20}$ | $C_{21}+$ | $CO_2$ |
| FTS alone | 0 | 8 | 4 | 63 | 25 | <1 |
| 30:70 FTS + Pd/ZSM-5 | 12.5 | 9 | 5 | 82 | 4 | <1 |

TABLE 3

$C_4$ Isomer Distributions for Mixed Bed with Pd/ZSM-5 at 215° C., 10 atm, and $H_2/CO = 1.5$, TOS > 300 h.

| | | $C_4$ Isomers | | |
|---|---|---|---|---|
| Catalyst | Zeolite/Co | 1-Butene/$C_4$ | Isobutene/$C_4$ | DOB† |
| FTS alone | 0 | 69% | 1% | 2% |
| 30:70 FTS + Pd/ZSM-5 | 12.5 | 9% | 9% | 9% |

†DOB = degree of branching (iso-$C_4$'s/total $C_4$'s)

TABLE 4

Activities of FTS alone and Mixed Bed with Pd/SSZ-33 at 220° C., 10 atm, and $H_2/CO = 1.5$, TOS > 300 h

| | | Synthesis Rates | |
|---|---|---|---|
| Catalyst | Zeolite/Co | $gCH_{2.2}/g_{catalyst}/h$ | $gCH_{2.2}/g_{Co}/h$ |
| FTS alone | 0 | 0.64 | 3.2 |
| 30:70 FTS + Pd/SSZ-33 | 12.5 | 0.18 | 3.1 |

TABLE 5

Carbon Number Distributions for FTS and Mixed Bed of FTS with Pd/SSZ-33 at 220° C., 10 atm, and $H_2/CO = 1.5$, TOS > 300 h

| | | Product Distribution (C % of total) | | | | |
|---|---|---|---|---|---|---|
| Catalyst | Zeolite/Co | $CH_4$ | $C_2$-$C_3$ | $C_4$-$C_{20}$ | $C_{21}+$ | $CO_2$ |
| FTS alone | 0 | 8 | 4 | 67 | 21 | <1 |
| 30:70 FTS + Pd/SSZ-33 | 12.5 | 9 | 4 | 82 | 5 | <1 |

TABLE 6

C$_4$ Isomer Distributions for FTS and Mixed Bed with Pd/SSZ-33 at 220° C., 10 atm, and H$_2$/CO = 1.5, TOS > 300 h.

| Catalyst | Zeolite/Co | C$_4$ Isomers | | DOB† |
| --- | --- | --- | --- | --- |
| | | 1-Butene/C$_4$ | Isobutene/C$_4$ | |
| FTS alone | 0 | 44% | 2% | 2% |
| 30:70 FTS + Pd/SSZ-33 | 12.5 | 16% | 5% | 6% |

†DOB = degree of branching (iso-C$_4$'s/total C$_4$'s)

While various embodiments have been described, it is to be understood that variations and modifications may be resorted to as will be apparent to those skilled in the art. Such variations and modifications are to be considered within the purview and scope of the claims appended hereto.

What is claimed is:

1. A process for converting synthesis gas to liquid hydrocarbons in a single reactor comprising:
    contacting a feed comprising a mixture of carbon monoxide and hydrogen having a H$_2$/CO ratio of between about 1 and about 2 with a catalyst bed comprising a mixture of:
    (a) a synthesis gas conversion catalyst including cobalt on a support containing an acidic component; and
    (b) a dual functionality catalyst including a hydrogenation component and a solid acid component;
    at a pressure of greater than about 5 atmospheres and a temperature of greater than about 210° C.,
    thereby resulting in a hydrocarbon product containing at least about 25 vol % C$_{10}$+, containing no greater than about 5 wt % C$_{21}$+ and containing no greater than about 25 wt % C$_1$-C$_4$.

2. The process of claim 1 wherein the weight ratio of solid acid component to cobalt is between about 7 and about 17.

3. The process of claim 1 wherein the temperature is between about 210° C. and about 230° C.

4. The process of claim 1 wherein the process has a productivity of at least about 2 g of hydrocarbons per gram of cobalt per hour as determined at 10 atmospheres, 215° C. and a H$_2$/CO ratio of 1.5.

5. The process of claim 1 wherein the hydrogenation catalyst is directly supported on zeolite.

6. The process of claim 1 wherein the hydrogenation catalyst is directly supported on an alumina-bound zeolite.

7. The process of claim 1 wherein the hydrogenation component comprises a Group VIII metal selected from the group consisting of rhodium, iridium, palladium and platinum.

8. The process of claim 1 wherein the solid acid catalyst comprises a zeolite.

9. The process of claim 1 wherein the synthesis gas conversion catalyst further comprises a
    promoter selected from the group ruthenium, rhenium, platinum, palladium, iridium, osmium, rhodium, gold, silver, group IIIB metal oxides, group IVB metal oxides, and combinations thereof.

10. The process of claim 1 wherein the product comprises:
    0-20 weight % CH$_4$;
    0-20 weight % C$_2$-C$_4$;
    50-95 weight % C$_{5+}$; and
    4 weight % C$_{21+}$.

11. The process of claim 1 further including recycle of tail gas wherein the single pass CO conversion rate is less than about 60%, and the overall CO conversion rate including recycle is greater than about 90%.

12. The process of claim 1 wherein the reaction pressure is between about 5 atmospheres and about 25 atmospheres.

13. The process of claim 1 wherein the reactor is a fixed bed reactor.

14. The process of claim 1 wherein the hydrocarbon product contains less than about 5 wt % C$_{21}$+ normal paraffins or normal olefins.

* * * * *